United States Patent Office 3,400,601
Patented Sept. 10, 1968

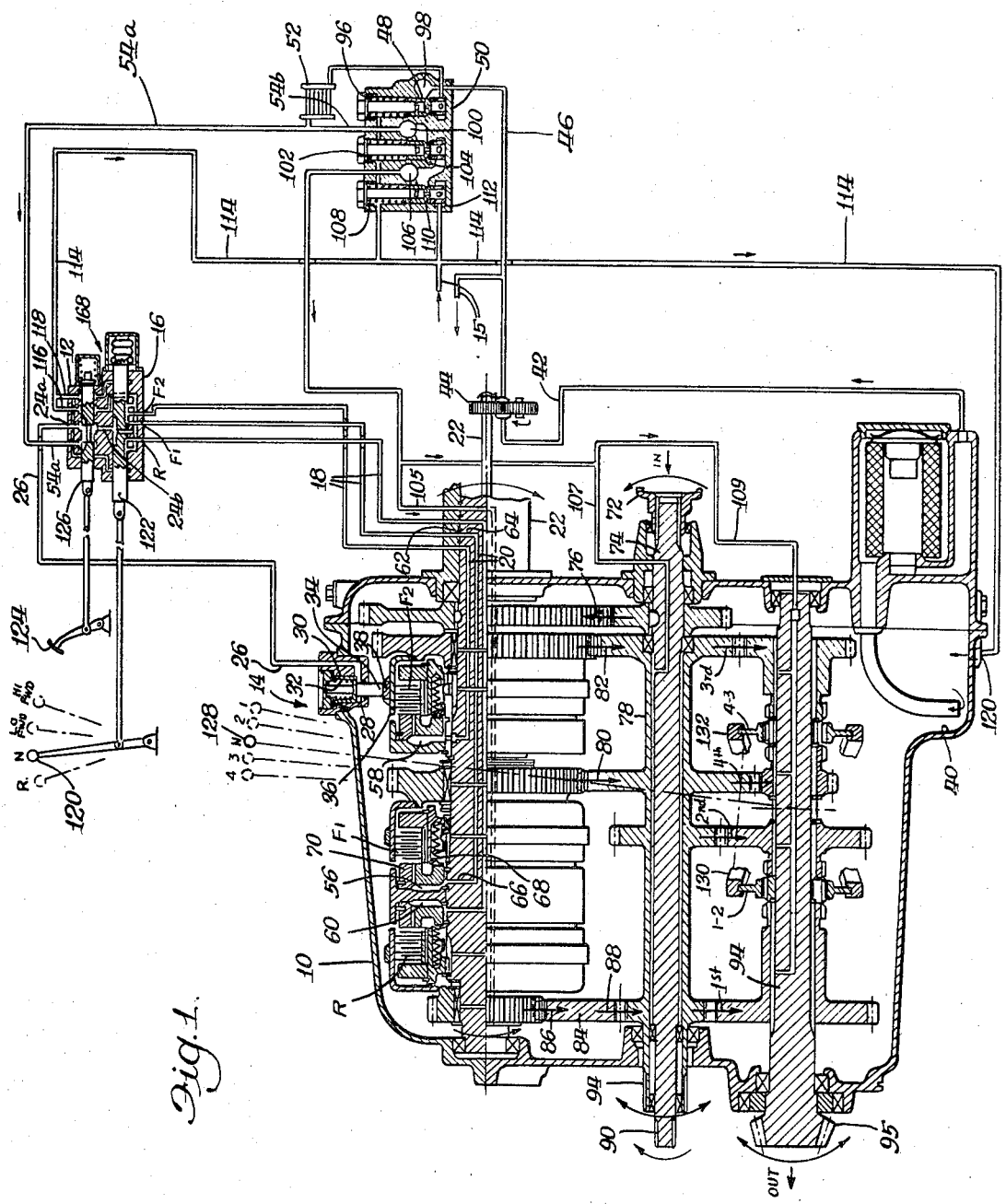

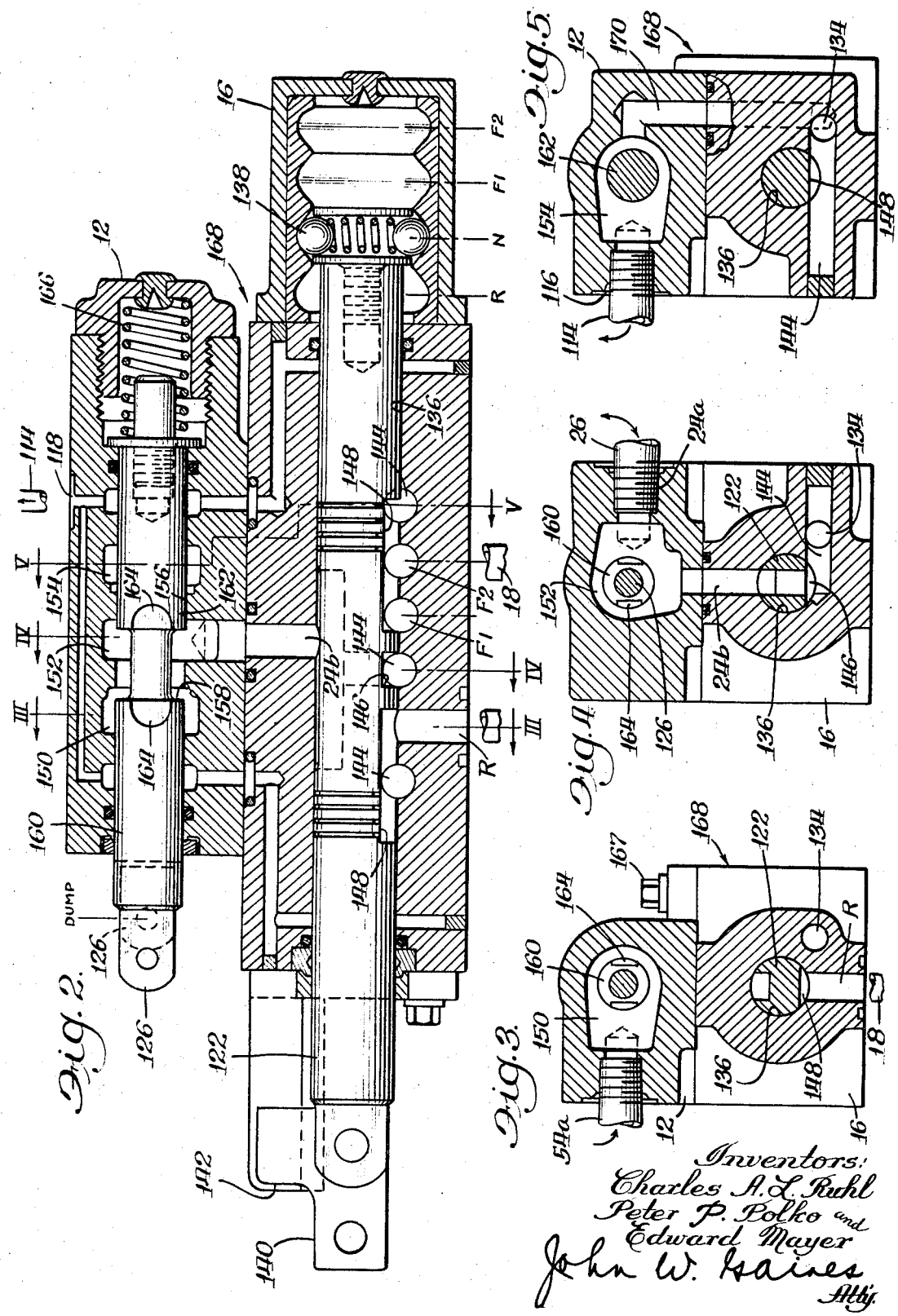

3,400,601
TRANSMISSION HAVING SLOW-DOWN BRAKE AND DUMP VALVE
Charles A. L. Ruhl, Wheaton, Peter P. Polko, Lyons, and Edward Mayer, North Riverside, Ill., assignors to International Harvester Company, Chicago, Ill., a corporation of Delaware
Filed July 25, 1966, Ser. No. 567,618
21 Claims. (Cl. 74—339)

ABSTRACT OF THE DISCLOSURE

Forward-reverse gear transmission in a power train of the kind for driving a tractor, having an alternately operable transmission slow-down brake and a conventional clutch engageable to establish drive in the power train. De-clutching, which is a necessary incident to gear shifting in the gear transmission, is attended by automatic engagement of the transmission slow-down brake for immediately conditioning the transmission by braking the moving parts thereof to minimize gear clashing and thereby expedite the shift.

---

In a vehicle gear transmission equipped with our arrangement of a slow-down brake and a dump valve, and as illustrated generally at 10 in the accompanying drawings, a novel coaction is established by a modulating dump valve 12 and a transmission slow-down brake 14 which we provide. As will be explained, hand shifts into selected speed ratios are made by the driver without delay, without difficulty, and without synchronizers, which can be eliminated from the transmission if desired.

The present transmission 10, being primarily adapted for use in steered-by-driving tractors, is a clutch-controlled, so-called power shift transmission, in which the dump valve causes the transmission to neutralize due to a pressure-modulating, declutching action of the dump valve. Broadly stated, we provide an operation characterized by the rotating parts of the transmission being automatically braked at 14, with a force which, when it arises, corresponds to the amount of modulation produced by the dump valve 12, and which arises as soon as the transmission 10 starts neutralizing due to the declutching.

A careful distinction is necessary, consistent with the relation that the magnitude of the modulated pressure increases with the amount that the pressure modulation (drop) decreases.

Specifically, the dump valve 12 is mounted atop, and hydraulically upstream of, a transmission range selector valve 16. Supply passages R, F1, and F2 form inlet-outlet ports in the range valve 16 and have separate means of connection 18 to longitudinal passages 20 formed in a drilled clutch shaft 22 in the transmission.

A supply passage 24a (FIGURE 1) forms an inlet-outlet port in the valve body of the dump valve 12 and has a conduit 26 connecting the passage 24a and the fluid inside a cylinder 28 of the brake 14. A piston 30 in the cylinder, controlled by the pressure of the fluid and by a spring 32, operates a brake element 34 which is stud-shaped and which brakes a clutch drum 36 that is independently rotatably carried by the clutch shaft 22. More specifically, the brake element 34 engages the metal wear surface of an external reinforcing band 38 which is welded to the midsection of the drum 36.

Fluid flow

Fluid flow to and through the transmission 10 leads in a path from a sump 40 through a pump suction line 42, a gear-type transmission pump 44, a pump discharge line 46, a high pressure valve 48 in a regulator valve assembly 50, an air-to-oil cooler 52, the branch 54a of a line-pressure line having branches 54a and 54b, and the dump valve 12, thence through branches a first of which consists of the path including the passage 24a and a second of which includes a passage 24b. The passage 24b is interconnected through the range valve 16 with a selected one of the supply passages F1, F2, or R leading through the separate means of connection 18, thence to a respective first clutch cylinder 56, speed clutch cylinder 58, and directional clutch cylinder 60.

As one specific example (FIGURE 1), the inlet-outlet port formed by the supply passage F1 in the range valve 16 handles fluid flowing in a path through the appropriate means of connections 18, rotary seals 62 on the clutch shaft 22, and a radial passage 64 in the drilled shaft 22, then through the appropriate longitudinal passage and an interconnected radial passage 66 in the shaft 22, and thence into the annular cylinder 56 which, when extended whereby it overcomes the force of a return spring 68, operates friction clutch plates by means of a clutch piston 70 in the cylinder.

Power shift

The torque or power flow to and through the transmission 10 follows a power shift path from an engine connected universal coupling 72, through a drilled, inner input shaft 74, a pinion and gear path in the direction indicated by an arrow 76, thence to the clutch shaft 22 which has contra-rotation to the input shaft 74 as indicated by arrows.

The clutch shaft 22 carries sets of clutch plates F1, F2, and R which are fluid actuated and controlled by the first cylinder 56, the speed cylinder 58, and the directional cylinder 60 for selectively clutching the clutch shaft 22. More specifically, the clutch plates F1, F2, and R couple the clutch shaft 22 to a transfer shaft 78 selectively in a gear path in the direction indicated by an arrow 80 for first-speed forward drive, or in a path indicated by an arrrow 82 for high-speed forward drive, or through a reverse idler gear 84 in a path indicated by an arrow 86 and an arrow 88 for rear or reverse drive.

The transfer shaft 78 is journaled for independent rotation on the inner input shaft 74, and an IPTO shaft or terminal 90 of the latter projects beyond the corresponding TPTO shaft or terminal 92 of the transfer shaft 78 to provide respective independent power take-off and transmission power take-off shafts. The TPTO shaft 94 is gear driven at two forward speeds and at one reverse speed. The IPTO shaft 90 runs independently of the transmission and at constant speed, i.e., engine speed.

Mechanical shift

The transfer shaft 78 is coupled to output in the posterior of the transmission 10 selectively in a first gear path in the direction indicated by an arrow 1ST, thence through the adjacent side of a conventional, mechanically operated shift clutch 1–2 to an output shaft 94, or in a second path in the direction indicated by an arrow 2ND, and through the adjacent side of the clutch 1–2 to the shaft 94, or in a third path in the direction indicated by an arrow 3RD, and through the adjacent side of a conventional, mechanically operated shift clutch 4–3 to the shaft 94, or in a fourth path indicated by an arrow 4TH, and through the adjacent side of the clutch 4–3 to the output shaft 94. The output shaft is wheel-connected, in a track driving path including gearing, axle, final drive, and sprockets and collectively represented by a bevel output pinion 95.

Overall, the transmission 10 provides eight speeds in forward drive, and four in reverse (R 1st., R 2nd, R 3rd, and R 4th). The transmission per se is shown and described in detail in Hugh and Williams patent application U.S. Ser. No. 567,306 filed July 22, 1966, which is owned by the assignee hereof and the disclosure of which is incorporated in entirety herein by reference.

Regulator

The high pressure valve 48 (FIGURE 1) in the regulator valve assembly 50 has a strong spring 96 controlling the valve 48, which valve compresses the spring and permits fluid flow from the pump to the cooler 52 as long as the pump output pressure in a chamber 98 in the assembly 50 exceeds line pressure by a predetermined amount (e.g., 55 p.s.i.). The resulting forced flow through the cooler 52 causes a pressure drop toward a predetermined line value desired to be maintained in a chamber 100 which is supplied by the line pressure branch 54b. An intermediate spring 102 controls an intermediate valve 104 which permits fluid flow from the chamber 100 to a lube pressure chamber 106 when the line pressure exceeds the predetermined line pressure value.

The low lube pressure chamber 106 is connected by lines and branches 105, 107, and 109 to the drilled shafts 22, 74, and 94 for lubrication purposes.

A weak spring 108 controls a lube pressure valve 110 which permits fluid flow from the lube pressure chamber 106 to drain chamber 112 when the lube pressure exceeds a value of, for example, 20 p.s.i. In normal running, the design capacity of the system is such that the valves 48, 104, and 110 are in continual, fluid transmitting operation in order to handle the volume of fluid flow.

Drain fluid is discharged into a common drain line 114 first by the chamber 112, second by one of the steering lines 15, and third by a pair of passages forming drain outlet ports 116 and 118 in the dump valve 12. The common drain line 114 discharges through a drain port 120 and returns the fluid to the sump 40. The steering lines 15 are the service lines for right and left, track controlling, steering valves, not shown, but provided to control the tractor by power steering.

Following is an example of the pressures:
Approximate pump discharge pressure 130 p.s.i.
Approximate line pressure 75 p.s.i.
Approximate lube oil pressure 20 p.s.i.
Approximate drain pressure 0 p.s.i.

In addition to the referred to right and left, track controlling, steering valves, not shown, there are three further controls. They include a range lever handle 120 by which the driver positions the spool element 122 among four positions within the range valve 16, a dump valve pedal 24 by which the driver positions a spool element 126 into both the released and the dump positions, and also into progressive intermediate positions thereof in the dump valve 12, and a shift lever handle 128 by which the driver selectively positions two forks 130 and 132 for effecting tooth-clutched engagement in the mechanical shift clutches 1–2 and 4–3.

Range selector valve—FIGURES 2, 3, 4, and 5

The range valve 16 has a longitudinal low pressure passage 134 (FIGURES 3, 4, and 5) in the body and a longitudinal bore 136 slidably receiving the spool element 122. Two ball detents 138 carried at one end of the spool element 122 fit in discrete sockets designated by their appropriate abbreviations R, N, F1, and F2 corresponding to the similarly designated four discrete positions of the handle 120 and also the element 122. An upright link 140 has a pivoted connection to the other end of the element 122, and the link 140 also has a lug and slot connection 142 to the body of the valve 16 to prevent the spool element from turning as it slides longitudinally.

Three neutral, low pressure passages 144 are connected in common to the longitudinal low pressure passage 134 in the valve body.

Fluid in the branch 24b of the fluid flow path is selectively transmitted by a short, flat milled groove 146 in the spool 122 to any one of the central neutral, low pressure passages 144, or the supply passage R to one side thereof, or the mutually spaced apart passages F1 and F2 on the other side thereof. A pair of flat milled grooves 148 disposed one on each side of the groove 146 connects at all times the unselected ones of the supply passages with the neutral, low pressure passages 144. Hence either none or, at most, one of the directional and speed clutches is engaged.

Modulated dump valve—FIGURES 2, 3, 4, and 5

The dump valve 12 has a line pressure chamber 150, an intermediate chamber 152, and a low pressure chamber 154 arranged therein in that order and intersected in that order by a common longitudinal bore 156. The spool element 126 slides in the bore 156 and defines a passage 158 in a reduced portion of the element between two confronting spools 160 and 162. The spool passage 158 is modulatingly controlled by the progressive covering and uncovering of fingernail shaped grooves 164 which uniformly increase in depth to a maximum at their adjacent ends where they each intersect the end of the associated spool.

The result of the groove formation is that the groove 164 on the spool 160, when such groove enters the chamber 150, presents a cross-section of a dimension that deepens in the direction of relative uncovering so that the fluid flow and pressure drop across the groove are finely modulated in bringing the chambers 150 and 152 into intercommunication. The groove 164 on the spool 162 has the same, finely modulating effect when the low pressure chamber 154 is progressively brought into intercommunication with the chamber 152.

The valve element 126, either mutually exclusively or simultaneously as will be apparent, permits first fluid flow between the line pressure and intermediate chambers 150, 152, and permits second fluid flow between the intermediate and low pressure chambers 152, 154, in a manner such that each fluid flow varies inversely to the other up to a maximum of either one attended by no flow in the other. A spring 166 biases the element 126 into the solid line, restored position intercommunicating the chambers 150 and 152, and blocking the chamber 154.

Control valve assembly

The dump valve and range valve bodies are bolted together by bolts 167 (FIGURE 3) as a joint housing assembly 168 to mutually form transverse interconnecting passages including the branch 24b (FIGURE 4) and a passage 170 (FIGURE 5). The passage 170 is included in a path of fluid intercommunication leading from the low pressure passages 144, through the longitudinal passage 134, said passage 170, the low pressure chamber 154, and the outlet port 116, thence to the common drain line 114. The spool elements 122 and 126 therefore communicate with the low pressure chamber 154 each independently of the other (FIGURE 5).

To the contrary, the spool element 122 does not communicate directly or independently with the line pressure chamber 150, and the associated branch 24b thereto and also the other branch 24a (FIGURE 4) communicate through the intermediate chamber 152 to the line pressure chamber 150. The result is that the relatively upstream dump valve 126 controls by its modulating action the pressure of the fluid transmitted by the line 26 to the brake cylinder and controls the pressure transmitted through the valve 16 to the selected clutch cylinders. When the pressure in the intermediate chamber 152 is only slightly modulated so that it approaches line pressure, the selected clutch cylinder and the brake cylinder have high pressure fluid applied thereto and when the pressure in the intermediate chamber 152 drops so as to approach the drain pressure value, then fluid is exhausted from the brake cylinder and the selected clutch cylinder.

Placing the spool element 122 in the neutral position insures that the spool 126 cannot pressurize either the brake or clutch cylinders, because the central neutral, low pressure passage 144 is opened by the element 122 and connects the cylinders to drain. Depressing the spool element 126 into full dump position insures that the spool element 122 cannot apply fluid pressure to the brake or to the clutch cylinders because in that position the spool element 126 places the intermediate and low pressure chambers 152 and 154 in free communication with one another.

The pedal 124 (FIGURE 1) enables the driver to use his foot in controlling tractor operation. More particularly, the dump valve 12 controlled by the pedal 124 affords not only a shortcut way of neutralizing the transmission without disturbing the range lever handle while it remains in an operating position, but it also affords a primary clutching function and a secondary clutching and braking function as will now be explained. The importance will be apparent.

Primary function

This function is of advantage after the handles 120 and 128 occupy operating positions. Pariable depression of the pedal 124 causes pressure modulation in the selected one of the clutch cylinders 56, 58 or 60, which is important in "inching" the tractor or otherwise maneuvering under condition of relatively close quarters or other circumstances requiring precise control. The driver can thus connect the selected operating cylinder to a high or low pressure source or combinations of the two at will. Very often, use of the tractor brakes, not shown, is not necessary but, in some situations, the pedal 124 is fully depressed and the vehicle brakes are employed for control.

Secondary function

A brake and clutch function is the secondary function and is utilized during tractor movement when gear changes are to be effected by the shift lever handle 128. The driver depresses the pedal 124 to a suitable degree. shifts the handle 128 from one operating position, e.g., the first position, to another operating position, and releases the pedal 124. He thus effects a shift smoothly and in the desired way without disturbing the range lever handle 120.

The transmission transfer portion, including the centrally located transfer shaft 78, is the part immediately affected in the power train. The active set of clutch plates R, F1, or F2 has the activating pressure force therein reduced by an amount by which the line pressure has been modulated so that the transfer portion has a slipping or disengaged drive input thereto. The spring 32 in the brake 14 expands and the excess of its force increases with the amount of pressure modulation (i.e., pressure drop in the fluid). Moreover throughout the shift from one operating position to the other by the shift lever handle 127, the wheel drive through the output shaft 94 to the transfer portion is disconnected, so that the transfer portion will respond to the arresting action of the brake 14.

Hence the transfer portion slows to a speed compatible with that of the output shaft 94 and an easy upshift can be effected by the handle 128, without necessity for synchronizers in the transmission. Thereafter, the driver slowly withdraws his foot and the dump pedal 124 is gradually released, increasing the modulated pressure and recoupling the engine, not shown, with the tractor wheels, not shown.

Increasing the modulated pressure by release of the dump pedal 124 also causes the brake 14 to release in the desired way.

If the outlet port 116 of the housing assembly 168 (FIGURES 1 and 5) is repiped so that the fluid flow therethrough from the assembly 168 is connected to and supplies the lube oil chamber 106, the two flows from the valve will leave, and will stay separate, and so the pressure will not be completely wasted when dump pedal 124 is depressed or when the range lever handle 120 is set in neutral. The outlet port 118 (FIGURES 1 and 2) remains connected to the common drain line 114 and, in any case, the piping is rendered simpler as actually illustrated by likewise connecting the outlet port 116 to the common drain line.

The brake spring 32 and the clutch springs (e.g., spring 68) are arranged in a manner whereby the transmission is spring braked and spring declutched. It is evident that a reversal of the connections to the brake and clutches would enable the transmission, if desired, to be pressure braked and to be pressure declutched, in response to the magnitude of the modulated pressure fed thereto.

What is claimed is:

1. A plural power path transmission having:
   two fluid actuated devices consisting of a transmission slow-down brake and a transmission clutch, said clutch effective when the slow-down brake is not holding the over-all transmission against rotation, to set the portions of at least one of the power paths of the transmission in rotation to transmit drive in that path;
   said devices being controlled by a spring individual to each and by a common fluid line connected to transmit fluid in the line thereto; and
   a line-pressure-modulating, dump valve in the fluid line affording similarly modulated pressures applied simultaneously to both devices.

2. Control system for a hydromechanically controlled, plural power path, gear transmission, comprising:
   clutch cylinder means clutchable to set the portions of at least one of the power paths of the transmission in rotation to transmit a gear drive in that path;
   brake cylinder means brakable to arrest motion of the portions of the transmission as and after the drive is declutched;
   the two cylinder means being controlled by individual springs connected therein and by a common hydraulic line connected to transmit fluid in the line thereto; and
   a line-pressure-modulating, dump valve in the hydraulic line enabling similarly modulated pressures to be applied simultaneously to said two cylinder means.

3. The system of claim 2, characterized by:
   there being two sets of the line and spring connections to the cylinder means each connected in a different way from the other set and each to a different one of the cylinder means, whereby one cylinder means is applied with a force corresponding to the modulated pressure and the other is applied with a force inverse to the modulated pressure.

4. The system as claimed in claim 3, for use with the transmission as described, and when such transmission is equipped with mechanical-shift-clutch (1–2, 3–4) controlled gears in the output portion, and with clutch cylinder controlled, constantly meshing gears in the transfer portion (36, 78), said system characterized by:

said brake cylinder means (28) being operatively related to directly arrest motion of one of said portions of the transmission; and means (10) supporting the brake cylinder means in the operative relationship described, to facilitate mechanical (1-2, 3-4) clutch shifting in the output portion by preliminarily arresting transmission motion.

5. The invention of claim 4, characterized by:
said brake cylinder means being effective to directly brake the transfer portion (36, 78); and
a gear lever (128) connected to selectively shift the mechanical-shift-clutches in the output portion of the transmission.

6. The invention of claim 5, further characterized by:
said clutch cylinder means being declutched and said brake cylinder means being brakingly engaged, each with a force inverse to the modulated pressure.

7. The invention of claim 6, said clutch cylinder means being characterized by speed clutches (F1, F2) providing plural ratio gear drives;
said mechanical-shift-clutches (1-2, 3-4) being characterized by interengageable, toothed clutches to effect gear ratio changes.

8. The invention of claim 7, said clutch cylinder means being further characterized by directional clutches (F1, R) which, together with the speed clutches aforesaid, provide plural forward and reverse gear drive ratios and which, together with the speed clutches, are connected to said line.

9. The invention of claim 8, characterized by:
a range selector valve (16) in said line between the modulating dump valve and the directional and speed clutches, and effective to cause a selected one of the clutches to be clutched;
said modulating dump valve thereby being effective to progressively declutch the selectively clutched one of the clutches independently of the range selector valve.

10. The system as claimed in claim 4, in combination with the transmission as described therein, said transmission having:
an input shaft (74);
separate, gear carrying, transfer and output shafts (78, 94) in the respective transfer and output portions of the transmission; and
an interior portion (22) in the transmission comprising a clutch cylinder shaft coupling the input shaft and the transfer portion (36, 78) of the transmission.

11. The invention of claim 10, characterized by said input and transfer shafts (74, 78) being coaxial.

12. The invention of claim 11, further characterized by:
said transfer shaft (78) being in constant mesh between the structures of the clutch cylinder shaft (22) and the output shaft (94).

13. The invention of claim 9, further characterized by:
means supplying line pressure fluid into said line (54a and b) in a path including a pump, a first relief valve (48), and a cooler (52) having a point of connection in said line; and
a second relief valve (104) interconnecting a lube pressure conduit (105) with the line (54a and b) at another point of connection (100) such that discharge from the cooler feeds the second relief valve and the modulating dump valve.

14. The invention of claim 13, further characterized by:
the first relief valve permitting fluid flow from said pump to said cooler when the pump output pressure exceeds a predetermined value, the flow through said cooler causing a pressure drop toward a lower predetermined value;
said second relief valve permitting fluid flow from said line to the lube pressure conduit when line pressure exceeds the lower predetermined value.

15. The invention of claim 9, characterized by:
the modulating dump valve and the range selector valve constituting a bolted together valve assembly (168).

16. A control valve assembly comprising:
a housing having line, intermediate, and low pressure chambers arranged in that order;
a common bore (156) intersecting the chambers in the order given;
a second bore (136) in said housing in fluid communication with the intermediate chamber, with the low pressure chamber, and with plural supply passages in said housing;
a range selector valve in the second bore movable, from a position interconnecting the intermediate and low pressure chambers, to discrete operating positions interconnecting the intermediate chamber and any one selected supply passage and interconnecting the low pressure chamber and the unselected supply passages; and
a modulating dump valve in said common bore incrementally adjustable between modulating positions permitting first fluid flow between the line pressure and intermediate chambers and second fluid flow between the intermediate and low pressure chambers, in a manner such that each fluid flow varies inversely to the other.

17. The invention of claim 16, in combination with and included in an hydraulic system for a transmission, and having plural hydraulically operated devices consisting of a transmission-braking brake and at least one transmission clutch, said combination comprising:
a circuit providing regulated line pressure in communication with the line pressure chamber;
a low pressure circuit in communication with the low pressure chamber; and
separate means (18) hydraulically connecting the hydraulically operated devices each with a different one of the supply ports.

18. The invention of claim 17, characterized by:
said modulating dump valve being effective to modulate the pressure in the intermediate chamber to any value between the line and low pressures;
the hydraulically operated devices being controlled by individual springs connected therein and by the fluid pressure in the separate means of hydraulic connection (18) aforesaid.

19. The invention of claim 18, characterized by each set of hydraulic and spring connections to the transmission brake and to the transmission clutch, respectively, being connected in a different way from the other set, and further characterized by both said transmission clutch being declutched and said transmission brake being brakingly engaged simultaneously with a force inverse to the modulated pressure in said intermediate chamber.

20. The invention of claim 19, in combination with and included in the transmission as described in claim 17, comprising:
an input shaft in the transmission;
an output shaft;
a transfer portion (36, 78) in the transmission coupled to the input shaft by means including a plurality of said transmission clutches and coupled to the output shaft by means including a plurality of mechanical-shift-clutches; and
a wear surface (36) carried by the transfer portion in confronting relation to said transmission brake;
said transmission brake comprising a braking element frictionally engaged with said wear surface, and a cylinder and a spring connected to said element in opposition to one another, and arranged with the modulating pressure communicating through the means of hydraulic connection (26) with the fluid inside the cylinder in a direction to disengage said element from the wear surface.

21. The invention of claim 16, characterized by:
said dump valve operating with a covering and uncovering movement of the parts thereof relative to one another, and having one such part provided with a fluid conducting groove (164) formed so as to present a deepening, enlarging cross-section in the direction of relative uncovering so as to finely modulate the fluid flow and pressure drop as the valve progressively operates.

References Cited

UNITED STATES PATENTS

| | | | |
|---|---|---|---|
| 3,181,385 | 5/1965 | Siler | 74—364 |
| 3,313,383 | 4/1967 | Tendresse | 192—4 |
| 3,321,054 | 5/1967 | Johnson et al. | 192—18 |

FRED C. MATTERN, Jr., *Primary Examiner.*

H. S. LAYTON, *Assistant Examiner.*